O. H. JONES.
BALL COCK.
APPLICATION FILED FEB. 26, 1918.
1,394,022.
Patented Oct. 18, 1921.
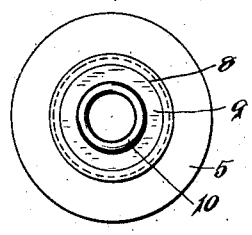
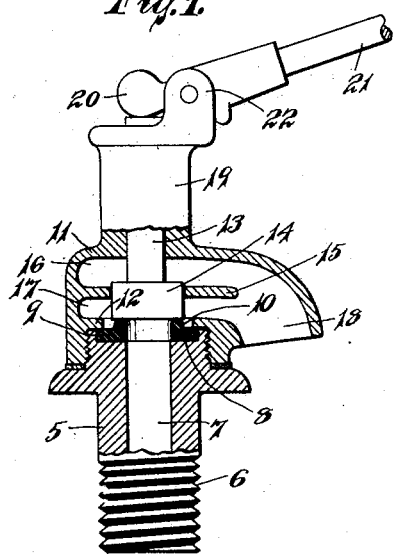
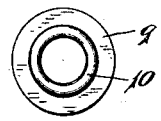
INVENTOR.
Owen H. Jones.
BY
Arthur B. Jenkins
ATTORNEY.

UNITED STATES PATENT OFFICE.

OWEN H. JONES, OF HARTFORD, CONNECTICUT.

BALL-COCK.

1,394,022.   Specification of Letters Patent.   Patented Oct. 18, 1921.

Application filed February 26, 1918.  Serial No. 219,233.

*To all whom it may concern:*

Be it known that I, OWEN H. JONES, a citizen of the United States, residing at Hartford, in the county of Hartford and State of Connecticut, have invented a new and Improved Ball-Cock, of which the following is a specification.

My invention relates more especially to the class of valves employed for controlling the flow of water to a tank and which embody a float connected with the valve to effect its operation, and an object of my invention, among others, is to provide a ball cock that shall be particularly durable and one that shall be especially effective in its operation.

One form of device embodying my invention and in the construction and use of which the objects herein set out, as well as others, may be attained, is illustrated in the accompanying drawings, in which—

Figure 1 is a view in side elevation of a ball cock embodying my invention, with parts broken away in central longitudinal section to show construction.

Fig. 2 is a plan view of the body section of my improved ball cock.

Fig. 3 is a plan view of the removable seat.

Fig. 4 is an edge view of the same.

In the accompanying drawings the numeral 5 denotes the body section of my improved ball cock that may be of any suitable shape and of any desired material and that may be provided with the usual thread 6 as a means of connection for an inlet pipe. An inlet passage 7 extends through this body section and a valve seat is formed at the mouth of this inlet passage. My invention has to do especially with the formation of this valve seat in connection with the construction of the valve stem and the valve thereon.

In adapting my invention to the structure shown herein a recess 8 is formed in the inner end of the body section and surrounding the inlet 7, and a plate 9 is formed to fit this recess, this plate having a rib extending around a central opening in the plate and comprising a valve seat 10, the structure in fact constituting a valve seat with a rib to receive a valve and a flange to serve as a means for securing the seat in place.

The cap section 11 is formed to fit a thread on the body section in a manner common to valves of this class. In carrying out my improvement, however, I provide a lip 12 surrounding a central opening in the cap section, which lip overlies the plate 9 and thereby serves to secure the valve seat rigidly in place. I prefer to construct this valve seat of some yielding material, as rubber, and when so constructed a plunger comprising a head 14 will be formed of metal, as brass or similar material.

A diaphragm 15 extends partially across the chamber in the cap section and overlies the recess 8, thus dividing said section into a relief chamber 16 and an inlet chamber 17, the space at the edge of said diaphragm comprising an outlet chamber 18.

The valve or plunger head 14 fits an opening through the diaphragm 15, and the shank 13 of said plunger passes upwardly through the neck 19 of the cap section, its end being acted upon by the end 20 of a float rod 21 in a manner that will be readily understood, said float rod being secured between ears 22.

By constructing the head 14 with a shoulder between it and the shank 13 the continuity of the head is broken, and any liquid passing between the outer surface of the head and the edge of the opening through the diaphragm 15 will be diverted into the relief chamber 16 and will thus be prevented from passing along the shank 13 and spurting of the water out at the end of the neck 19 will thus be prevented.

In accordance with the provisions of the patent statutes I have described the principles of operation of my invention, together with the device which I now consider to represent the best embodiment thereof; but I desire to have it understood that the ball cock shown is only illustrative and that the invention may be carried out by other means.

I claim:

A ball cock comprising a body section having a recess in one end, a cap section having a neck and a lip overlying said recess, means for securing said sections together, a valve seat removably held in said recess by said lip, a diaphragm extending across the chamber in the cap section and overlying said recess, and a plunger comprising a head fitting an opening in said diaphragm, and a shank of reduced diameter extending from said head through an opening in said neck whereby water pressure is diverted at the head and away from said shank.

OWEN H. JONES.